United States Patent
Tashev et al.

(10) Patent No.: US 10,276,179 B2
(45) Date of Patent: Apr. 30, 2019

(54) SPEECH ENHANCEMENT WITH LOW-ORDER NON-NEGATIVE MATRIX FACTORIZATION

(71) Applicant: Microsoft Technology Licensing, LLC, Redmond, WA (US)

(72) Inventors: Ivan Jelev Tashev, Kirkland, WA (US); Shuayb M Zarar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/626,016

(22) Filed: Jun. 16, 2017

(65) Prior Publication Data

US 2018/0254050 A1 Sep. 6, 2018

Related U.S. Application Data

(60) Provisional application No. 62/467,738, filed on Mar. 6, 2017.

(51) Int. Cl.
*G10L 15/00* (2013.01)
*G10L 19/00* (2013.01)
(Continued)

(52) U.S. Cl.
CPC ...... *G10L 21/0205* (2013.01); *G06F 17/2735* (2013.01); *G10L 21/0208* (2013.01)

(58) Field of Classification Search
None
See application file for complete search history.

(56) References Cited

U.S. PATENT DOCUMENTS

| 4,752,896 A | 6/1988 | Matsumoto |
| 8,323,106 B2 | 12/2012 | Zalewski |

(Continued)

FOREIGN PATENT DOCUMENTS

| CN | 103559888 A | 2/2014 |
| CN | 104751855 A | 7/2015 |
| WO | 2008145952 A1 | 12/2008 |

OTHER PUBLICATIONS

Kunze, K, et al., "Sensor placement variations in wearable activity recognition", In Proceedings of IEEE Pervasive Computing, vol. 13, Issue: 4, Oct. 2014, pp. 32-41.

(Continued)

*Primary Examiner* — Fariba Sirjani
(74) *Attorney, Agent, or Firm* — Drinker Biddle & Reath LLP (57) ABSTRACT

A system is provided that employs a statistical approach to semi-supervised speech enhancement with a low-order non-negative matrix factorization ("NMF"). The system enhances noisy speech based on multiple dictionaries with dictionary atoms derived from the same clean speech samples and generates an enhanced speech representation of the noisy speech by combining, for each dictionary, a clean speech representation of the noisy speech generated based on a NMF using the dictionary atoms of the dictionary. The system generates frequency-domain ("FD") clean speech sample representations of the clean speech samples, for example, using a Fourier transform. To generate each dictionary, the system generates a dictionary-unique initialization of the dictionary atoms and the activations and performs a NMF of the FD clean speech samples.

22 Claims, 9 Drawing Sheets

(51) Int. Cl.

| | |
|---|---|
| *G10L 21/00* | (2013.01) |
| *H04B 15/00* | (2006.01) |
| *H04R 15/00* | (2006.01) |
| *H04R 25/00* | (2006.01) |
| *G10L 21/02* | (2013.01) |
| *G10L 21/0208* | (2013.01) |
| *G06F 17/27* | (2006.01) |

(56) References Cited

U.S. PATENT DOCUMENTS

| | | | | |
|---|---|---|---|---|
| 8,907,929 | B2 | 12/2014 | Li et al. | |
| 9,668,066 | B1* | 5/2017 | Betts | H04R 25/40 |
| 2012/0001875 | A1 | 1/2012 | Li et al. | |
| 2014/0229168 | A1 | 8/2014 | Pandya | |
| 2015/0025880 | A1 | 1/2015 | Le roux et al. | |
| 2015/0112670 | A1* | 4/2015 | Le Roux | G10L 21/0208 704/226 |
| 2015/0154035 | A1 | 6/2015 | Zepeniuk et al. | |
| 2015/0243284 | A1* | 8/2015 | Guo | G10L 15/20 704/233 |
| 2016/0071526 | A1* | 3/2016 | Wingate | G10L 21/028 704/233 |
| 2016/0099008 | A1* | 4/2016 | Barker | H04R 25/505 704/233 |
| 2016/0111107 | A1 | 4/2016 | Erdogan et al. | |
| 2016/0241346 | A1* | 8/2016 | Hoffman | H04B 15/00 |
| 2016/0284346 | A1* | 9/2016 | Visser | G10L 15/16 |
| 2016/0300361 | A1 | 10/2016 | Xie et al. | |
| 2017/0162194 | A1* | 6/2017 | Nesta | G10L 15/20 |
| 2017/0300124 | A1 | 10/2017 | Tashev et al. | |

OTHER PUBLICATIONS

Lapinski, M, et al., "A distributed wearable, wireless sensor system for evaluating professional baseball pitchers and batters", In Proceedings of 2009 International Symposium on Wearable Computers, Sep. 4, 2009, 9 Pages.

Lee, D D., et al., "Algorithms for nonnegative matrix factorization", In Proceedings of the 13th International Conference on Neural Information Processing Systems, Dec. 2001, pp. 535-541.

Lee, Y D., et al., "Wireless sensor network based wearable smart shirt for ubiquitous health and activity monitoring", In Journal of Sensors and Actuators B: Chemical, vol. 140, Issue 2, Jul. 2009, pp. 390-395.

Li, D, et al., "Boosting accuracy of attribute prediction via SVD and NMF of instance-attribute matrix", In Proceedings of Pacific Rim Conference on Multimedia, Dec. 15, 2015, pp. 466-476.

Liolios, C, et al., "An overview of body sensor networks in enabling pervasive healthcare and assistive environments", In Proceedings of the 3rd International Conference on PErvasive Technologies Related to Assistive Environments, Jun. 23, 2010, 10 Pages.

Liu, et al., "SoundSense: 3D Gesture Sensing using Ultrasound on Mobile Devices", Retrieved From: https://mrorz.github.io/files/soundsense.pdf, Retrieved on: Mar. 23, 2017, 7 Pages.

Manninia, A, et al., "Accelerometer based recognition of the placement sites of a wearable sensor", In Journal of Pervasive and Mobile Computing, vol. 21, Aug. 1, 2015, pp. 62-74.

Mathie, M J., et al., "Accelerometry: Providing an integrated, practical method for long-term, ambulatory monitoring of human movement", In Proceedings of Physiological Measurement, vol. 25, Issue: 2, May 2004, 21 Pages.

Mejia-Roa, et al., "NMF-mGPU: non-negative matrix factorization on multi-GPU systems", In Journal of BMC Bioinformatics, Feb. 13, 2015, pp. 1-12.

Mohammadiha, et al., "Supervised and unsupervised speech enhancement using nonnegative matrix factorization", In Journal of IEEE Transactions on Audio, Speech, and Language Processing, vol. 21, No. 10, Oct. 21, 2013, pp. 1-12.

Mohammed, Shoaib, et al., "A Statistical Approach to Semi-Supervised Speech Enhancement With Low-Order Non-Negative Matrix Factorization", In Proceedings of IEEE International Conference on Acoustics, Speech and Signal Processing (ICASSP), Mar. 5, 2017, 5 Pages.

Mohammed, Shoaib, et al., "Unsupervised Deep Representation Learning to Remove Motion Artifacts in Free-mode Body Sensor Networks", In Proceedings of 2017 IEEE 14th International Conference on Wearable and Implantable Body Sensor Networks (BSN), May 9, 2017, 6 Pages.

Molchanov, et al., "Multi-sensor System for Driver's Hand-Gesture Recognition", In Proceedings of 2015 11th IEEE International Conference and Workshops on Automatic Face and Gesture Recognition (FG), May 4, 2015, 8 Pages.

Moore, S T., et al., "Long-term monitoring of gait in parkinson's disease", In Journal of Gait Posture, vol. 26, Issue 2, Jul. 2007, 8 Pages.

Mujibiya, et al., "The Sound of Touch: On-body Touch and Gesture Sensing Based on Transdermal Ultrasound Propagation", In Proceedings of the ACM international conference on Interactive tabletops and surfaces, Oct. 6, 2013, pp. 189-198.

Mysore, G J., "A block sparsity approach to multiple dictionary learning for audio modeling", In Proceedings of International Workshop on Sparsity, Dictionaries, Projections, Machine Learning, and Signal Processing, Jun. 2012, 4 Pages.

Mysore, G J., et al., "A non-negative approach to semi-supervised separation of speech from noise with the use of temporal dynamics", In Proceedings of IEEE International Conference on Acoustics, Speech and Signal Processing (ICASSP), May 2011, pp. 17-20.

Nordic Semiconductors, "nRF8001 bluetooth low energy connectivity IC", Retrieved From: https://www.nordicsemi.com/Products/, Retrieved Date: Jan. 1, 2017, 7 Pages.

Ordonez, F J., et al., "Deep convolutional and LSTM recurrent neural networks for multimodal wearable activity recognition", In Journal of Sensors, vol. 16, Issue 1, Jan. 18, 2016, pp. 115-130.

Palacios, et al., "Human-Computer Interaction Based on Hand Gestures Using RGB-D Sensors", In Journal of Sensors, vol. 13, Issue 9, Sep. 6, 2013, 27 Pages.

"International Search Report and Written Opinion Issued in PCT Application No. PCT/US2018/019796", dated Aug. 30, 2018, 18 Pages.

"International Search Report and Written Opinion Issued in PCT Application No. PCT/US2018/019796", dated Aug. 7, 2018, 17 Pages.

Periverzov, et al., "3D Imaging for Hand Gesture Recognition: Exploring the Software-Hardware Interaction of Current Technologies", In Journal of 3D Research, vol. 3, Issue 3, Sep. 2012, pp. 1-30.

Roux, J L., et al., "Ensemble learning for speech enhancement", In proceedings of IEEE Workshop on Applications of Signal Processing to Audio and Acoustics, Oct. 20, 2013, pp. 1-4.

Roux, J L., et al., "Sparse NMF—half-baked or well done?", In Proceedings of Mitsubishi Electric Research Laboratories (MERL), Rep. No. TR2015-023, Mar. 2015, 23 Pages.

Rusu, C, et al., "Perceptual evaluation of speech quality (PESQ): A new method for speech quality assessment of telephone networks and codecs", In Proceedings of 2001 IEEE International Conference on Acoustics, Speech, and Signal Processing, May 7, 2001, 4 Pages.

Sigg, et al., "Speech Enhancement Using Generative Dictionary Learning", In Proceedings of IEEE Transactions on Audio, Speech, and Language Processing, vol. 20, Issue 6, Aug. 2012, pp. 1698-1712.

Sprechmann, et al., "Supervised Non-Euclidean Sparse Nmf Via Bilevel Optimization With Applications to Speech Enhancement", In Proceedings of 4th Joint Workshop on Hands-free Speech Communication and Microphone Arrays, May 12, 2014, pp. 11-15.

ST Microelectronics, "LSM9DSO iNEMO inertial module:3D accelerometer, 3D gyroscope, 3D magnetometer", Retrieved From: https://www.st.com/resource/en/datasheet/lsm9ds1.pdf, Retrieved on: Jan. 1, 2017, 72 Pages.

(56) References Cited

OTHER PUBLICATIONS

Sun, D L., et al., "Universal speech models for speaker independent single channel source separation", In Proceedings of IEEE International Conference on Acoustics, Speech and Signal Processing, May 2013, pp. 141-145.
Texas Instruments, "TCA9548A: Low-voltage 8-channel I2C switch", Retrieved From: http://www.ti.com/product/TCA9548A, Retrieved Date: Jan. 1, 2017, 3 Pages.
Varga, A, et al., "Assessment for automatic speech recognition: II. NOISEX-92: A database and an experiment to study the effect of additive noise on speech recognition systems", In Proceedings of Speech Communication, vol. 12, Issue 3, Jul. 1993, pp. 247-251.
Vincent, et al., "Performance measurement in blind audio source separation", In Journal of IEEE Transactions on Audio, Speech, and Language Processing, vol. 14, Issue 4, Jul. 2006, pp. 1462-1469.
Virtanen, T, "Monaural sound source separation by nonnegative matrix factorization with temporal continuity and sparseness criteria", In proceedings of IEEE Transactions on Audio, Speech, and Language Processing, vol. 15, Issue: 3, Mar. 2007, pp. 1066-1074.
Wainwright, M J., et al., "Graphical models, exponential families, and variational inference", In Journal of Foundations and Trends in Machine Learning, vol. 1, Issue 1-2, Jan. 2008, pp. 1-305.
Weninger, et al., "Non-negative matrix factorization for highly noise-robust asr:To enhance or to recognize?", In Proceedings of IEEE International Conference on Acoustics, Speech and Signal Processing, Mar. 25, 2012, pp. 4681-4684.
Wild, S, et al., "Improving nonnegative matrix factorizations through structured initialization", In Proceedings of Pattern Recognition, vol. 37, Issue 11, Nov. 2004, pp. 2217-2232.
Xue, Y, et al., "Clustering-based initialization for non-negative matrix factorization", In Proceedings of Applied Mathematics and Computation, vol. 205, Issue 2, Nov. 15, 2008, pp. 525-536.
Zhang, Z, et al., "A survey of sparse representation: Algorithms and applications", In Proceedings of IEEE Access, vol. 3, May 2015, pp. 490-530.
Zheng, Z, et al., "Initialization enhancer for non-negative matrix factorization", In Proceedings of Engineering Applications of Artificial Intelligence, vol. 20, Issue 1, Feb. 2007, pp. 101-110.
"Elliptic Labs", Retrieved From: http://www.ellipticlabs.com/home/, Retrieved on: Mar. 23, 2017, 6 Pages.
"Opportunity human activity recognition challenge dataset 2012", Retrieved From: https://web.archive.org/web/20170404100301/http://www.opportunity-project.eu/challengeDataset, Retrieved on: Jan. 1, 2017, 3 Pages.
"Ultrasonic Gesture Recognition", Retrieved From: https://swarmlab.eecs.berkeley.edu/projects/4684/ultrasonic-gesture-recognition, Retrieved on: Mar. 23, 2017, 2 Pages.
Alinia, P, et al., "Impact of sensor misplacement on estimating metabolic equivalent of task with wearables", In Proceedings of 2015 IEEE 12th International Conference on Wearable and Implantable Body Sensor Networks (BSN), Jun. 9, 2015, 6 Pages.
Atmel, "ATmega32U4 low power 8-bit AVR RISC microcontroller", Retrieved From: http://www.atmel.com/devices/atmega32u4.aspx, Retrieved Date: Jan. 1, 2017, 3 Pages.
Baby, et al., "Coupled Dictionary Training for Exemplar-Based Speech Enhancement", In Proceedings of IEEE International Conference on Acoustics, Speech and Signal Processing, May 4, 2004, pp. 2883-2887.
Baraniuk, R G., et al., "Applications of sparse representation and compressive sensing", In Proceedings of the IEEE, vol. 98 , Issue: 6, Jun. 2010, pp. 906-909.
Bergh, et al., "Combining RGB and ToF Cameras for Real-Time 3D Hand Gesture Interaction", In Proceedings of 2011 IEEE Workshop on Applications of Computer Vision (WACV), Jan. 5, 2011, 7 Pages.
Bergmann, J H. M.., et al., "An attachable clothing sensor system for measuring knee joint angles", In Proceedings of IEEE Sensors Journal, vol. 13 , Issue: 10, Oct. 2013, pp. 4090-4097.
Bhiksha, Raj, et al., "Ultrasonic Doppler Sensing in HCI", In Proceedings of IEEE Pervasive Computing, vol. 11 , Issue: 2, Feb. 1, 2012, pp. 24-29.
Cao, H, et al., "Enabling technologies for wireless body area networks: A survey and outlook", In Proceedings of IEEE Communications Magazine, vol. 47, Issue: 12, Dec. 2009, pp. 84-93.
Catrysse, M, et al., "Towards the integration of textile sensors in a wireless monitoring suit", In Journal of Sensors and Actuators A: Physical, vol. 114, Issue 2, Sep. 2004, pp. 302-311.
Chavarriaga, R, et al., "The opportunity challenge: A benchmark database for on-body sensor-based activity recognition", In Journal of Pattern Recognition Letters, vol. 34, Issue 15, Nov. 2013, pp. 2033-2042.
Chen, M, et al., "Body area networks: A survey", In Journal of Mobile Networks and Applications, vol. 16, Issue 2, Apr. 2011, pp. 171-193.
Chen, et al., "Speaker Recognition of Noisy Short Utterance Based on Speech Frame Quality Discrimination and Three-stage Classification Model", In International Journal of Control and Automation, vol. 8, Issue 3, Mar. 2015, pp. 135-146.
Chochai, et al., "Real-time gesture recognition with finger naming by RGB camera and IR depth sensor", In Proceedings of IEEE International Conference on Robotics and Biomimetics (ROBIO), Dec. 5, 2014, pp. 931-936.
Das, Amit, et al., "Ultrasound based gesture recognition", In Proceedings of 2017 IEEE International Conference on Acoustics, Speech and Signal Processing (ICASSP), Mar. 5, 2017, pp. 406-410.
Dokmanic, Ivan, et al., "Hardware and algorithms for ultrasonic depth imaging", In Proceedings of 2014 IEEE International Conference on Acoustics, Speech and Signal Processing (ICASSP), May 4, 2014, pp. 6702-6706.
Eleni, Tsironi, et al., "Gesture Recognition with a Convolutional Long Short-Term Memory Recurrent Neural Network", In Proceedings of the European Symposium on Artificial Neural Networks, Computational Intelligence and Machine Learning (ESANN), Apr. 27, 2016, 6 Pages.
Enokibori, Y, et al., "A study of intermittent adjustment to resist displacement of smart garment using posture-stable daily actions", In Proceedings of UbiComp/ISWC Adjunct, Sep. 7, 2015, 4 Pages.
Ephraim, et al., "Speech enhancement using a minimum-mean square error short-time spectral amplitude estimator", In Journal of IEEE Transactions on Acoustics, Speech, and Signal Processing, vol. 32, Issue 6, Dec. 1984, pp. 1109-1121.
Fan, et al., "Speech enhancement using segmental nonnegative matrix Factorization", In Proceedings of IEEE International Conference on Acoustics, Speech and Signal Processing, May 9, 2014, pp. 4483-4487.
Freund, Yoav, "A Decision-Theoretic Generalization of On-Line Learning and an Application to Boosting", In Journal of Computer and System Sciences, vol. 55, Issue 1, Aug. 1997, pp. 119-139.
Garofolo, J S., et al., "TIMIT acoustic-phonetic continuous speech corpus", In Proceedings of Linguistic Data Consortium, Jan. 1993, 95 Pages.
Gioberto, G, et al., "Garment positioning and drift in garment-integrated wearable sensing", In Proceedings of 2012 16th International Symposium on Wearable Computers, Jun. 18, 2012, pp. 64-71.
Grais, E M., et al., "Initialization of nonnegative matrix factorization dictionaries for single channel source separation", In Proceedings of 21st Signal Processing and Communications Applications Conference (SIU), Apr. 24, 2013, pp. 1-4.
Grais, E M., et al., "Spectro-temporal post-smoothing in NMF based single-channel source separation", In Proceedings of Proceedings of the 20th European Signal Processing Conference (EUSIPCO), Aug. 27, 2012, pp. 584-588.
Greene, D, et al., "Ensemble non-negative matrix factorization methods for clustering protein-protein interactions", In Journal of Bioinformatics, vol. 24, Issue 15, Aug. 1, 2008, pp. 1722-1728.
Hirsch, et al., "The Aurora experimental framework for the performance evaluation of speech recognition systems under noisy conditions", In Proceedings of Automatic Speech Recognition: Challenges for the new Millenium ISCA Tutorial and Research Workshop, Sep. 18, 2000, 8 Pages.

(56) References Cited

OTHER PUBLICATIONS

Hoyer, P O., "Non-negative matrix factorization with sparseness constraints", In the Journal of Machine Learning Research, vol. 5, Nov. 2004, pp. 1457-1469.

Incel, O D., "Analysis of movement, orientation and rotation-based sensing for phone placement recognition", In Journal of Sensors (Basel), vol. 15, Issue 10, Oct. 5, 2015, pp. 25474-25506.

Invensense, "MPU-9150: Nine-axis Mems motion tracking device", Retrieved From: https://www.invensense.com/products/motion-tracking/9-axis/mpu-9150/, Retrieved on: Jan. 1, 2017, 5 Pages.

Jaureguiberry, X, et al., "Adaptation of source-specific dictionaries in non-negative matrix factorization for source separation", In Proceedings of IEEE International Conference on Acoustics, Speech and Signal Processing (ICASSP), May 22, 2011, pp. 5-8.

Kannan, et al., "A High-Performance Parallel Algorithm for Non-negative Matrix", In Proceedings of the 21st ACM SIGPLAN Symposium on Principles and Practice of Parallel Programming, Mar. 12, 2016, 11 Pages.

Kapuscinski, et al., "Recognition of Hand Gestures Observed by Depth Cameras", In Proceedings of International Journal of Advanced Robotic Systems, Apr. 14, 2015, pp. 1-15.

Kim, Y D., et al., "A method of initialization for non-negative matrix factorization", In Proceedings of IEEE International Conference on Acoustics, Speech and Signal Processing—ICASSP '07, Apr. 15, 2007, pp. 533-537.

King, B, et al., "Single-channel source separation using simplified-training complex matrix factorization", In Proceedings of IEEE International Conference on Acoustics, Speech and Signal Processing, Mar. 14, 2010, pp. 4206-4209.

Kingma, D P., et al., "Auto-encoding variational bayes", In Proceedings of International Conference Learning and Representation, Dec. 2013, pp. 13-21.

Koitka, et al., "nmfgpu4R: GPU-Accelerated Computation of the Non-Negative Matrix Factorization (NMF) Using CUDA Capable Hardware", In the R Journal, vol. 8, Issue 2, Dec. 2016, pp. 1-11.

\* cited by examiner

SPEECH ENHANCEMENT WITH LOW-ORDER NON-NEGATIVE MATRIX FACTORIZATION

CROSS-REFERENCE TO RELATED APPLICATION

This application claims the benefit of U.S. Provisional Application No. 62/467,738, filed on Mar. 6, 2017, which is hereby incorporated by reference in its entirety.

BACKGROUND

Speech that is electronically captured may be noisy in the sense that perceived quality of the speech is adversely affected by noise. For example, the perceived quality can be affected by background sounds, a low-quality microphone, transmission over various communications channels, and so on. If the perceived quality of speech is low, then it may difficult for a person to understand the speech or for speech to be further processed electronically, for example, using speech recognition techniques. To improve the perceived quality of such speech, various speech enhancement techniques have been employed such as filtering techniques (e.g., Weiner filtering), spectral restoration, and so on.

Sparsity is an important property of data that is exploited in a variety of signal-processing problems. In the context of non-negative matrix factorization ("NMF"), sparsity allows for the controlling of the uniqueness of signal representation. NMF may be used to factor amplitude spectrograms $V_{M \times T}$ representing speech into a product of dictionary atoms $W_{M \times K}$ and activations $H_{K \times T}$ where M represents frequency ranges, T represents number of frames or windows, and K represents the number of dictionary atoms. In the cases of $K \lessgtr M$ (denoting under- and over-complete representations), there are many possible solutions. In such cases, the non-uniqueness of the solutions found using NMF can be limited a certain degree by imposing constraints on the sparsity using a regularization term. Unfortunately, solutions to such a non-convex problem can be found through iterative updates that only guarantee local minima. As result of being solved via iterative updates, the quality of the factorization depends heavily on the initialization strategy.

When used for speech enhancement, NMF allows latent structures (speech is sparse and noise is not) in noisy speech signals to be inferred by factorizing their amplitude spectrograms V into a linear combination of basis functions W that define a convex cone as represented by Equation 1:

$$V \approx WH = \underset{W,H}{\operatorname{argmin}}[D(V \| \overline{WH}) + v\|\overline{H}\|_1] \quad (1)$$

where v controls the sparsity weight and D represents one of many possible divergence metrics. Since Equation 1 has no closed form solution, algorithms to solve it may use multiplicative updates to get the best approximation. The update algorithms start out with an initial seed for W and H, and continue to refine the estimates iteratively until they reach the desired level of error convergence. Although NMF has been used for speech enhancement, the quality of NMF factorizations are sensitive to initializations. Unfortunately, because globally optimal solutions cannot be guaranteed, it is likely that some random initialization will beat the best proposed strategy, which is why a random initialization strategy is often employed. However, with NMF, as the number of atoms in the dictionary atoms increases, the factorizations become consistent across different initializations. However, the computational resources (e.g., the amount of memory and the number of floating point operations) tends to increase O(K). Thus, higher-order factorizations (with larger number of atoms) lead to higher computational costs and are not desirable.

SUMMARY

A system that employs a statistical approach to semi-supervised speech enhancement with a low-order non-negative matrix factorization ("NMF") is provided. The system enhances noisy speech based on multiple dictionaries with dictionary atoms derived from the same clean speech samples and generates an enhanced speech representation of the noisy speech by combining, for each dictionary, a clean speech representation of the noisy speech generated based on a NMF using the dictionary atoms of the dictionary. The system generates frequency-domain ("FD") clean speech sample representations of the clean speech samples, for example, using a Fourier transform. To generate each dictionary, the system generates a dictionary-unique initialization of the dictionary atoms and the activations and performs a NMF of the FD clean speech samples.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system are provided that employ a statistical approach to semi-supervised speech enhancement with low-order NMF. In some embodiments, an NMF statistical estimation ("NMFSE") system enhances noisy speech based on multiple dictionaries with dictionary atoms derived from the same clean speech samples and generates an enhanced speech representation of the noisy speech by combining, for each dictionary, a clean speech representation of the noisy speech generated based on a NMF using the dictionary atoms of the dictionary. The MNFSE system generates the multiple dictionaries from clean speech samples. For example, the clean speech samples may be collected from people who are asked to say certain words and/or short phrases. The NMFSE system generates frequency-domain ("FD") clean speech sample representations of the clean speech samples, for example, using a Fourier transform. To generate each dictionary, the NMFSE system generates a dictionary-unique initialization of the dictionary atoms and the activations and performs a NMF of the FD clean speech samples. For example, the NMFSE system may receiving 10,000 clean speech samples and generate 20 dictionaries that each has 10 dictionary atoms. (Note: An empirical analysis by the inventors has indicated when only one dictionary is employed the perceived quality of enhanced speech levels off when the dictionary includes more than approximately 200 dictionary atoms. However, the computational cost increases by $O(K^2)$ where K is the number of dictionary atoms. So, for example, although the perceived quality improvement is minimal when increasing the number of dictionary atoms 10-fold from 200 to 2,000, the computational cost increases approximately 100-fold.)

The NMFSE system uses the resulting dictionary atoms of the multiple dictionaries to enhance noisy speech. Upon receiving noisy speech, the NMFSE system generates a FD noisy speech representation of the noisy speech (e.g., using a Fourier transform). For each of the multiple dictionaries, the NMFSE generates a FD clean speech representation corresponding to the FD noisy speech representation by performing a NMF of the FD noisy speech representation based on the dictionary atoms of the dictionary. To generate the FD clean speech representation based on a dictionary, the NMFSE system sets the atoms to the dictionary atoms and initializes the activations that represent the speech portion of the FD noisy speech representation and initializes atoms and activations that represent the noise portion of the FD noisy speech representation. The NMFSE system then performs a NMF by iteratively adjusting the activations for the speech portion and the atoms and activations for the noisy portion until a convergence criterion with the FD clean speech representation is satisfied. The NMFSE system then generates an enhanced FD clean speech representation of the noisy speech by combining the generated FD clean speech representations. For example, the NMFSE system may generate the combination by averaging the generated FD clean speech representations factoring in a spatio-temporal continuity property of speech. The NMFSE system then converts the enhanced FD clean speech representation into clean speech that represents an enhancement of the noisy speech (e.g., using an inverse Fourier transform).

In summary, the NMFSE system is adapted to achieve high representation accuracy with low-order NMF decompositions (low computational costs). The NMFSE system uses a statistical-estimation technique that exploits the diversity in NMFs across multiple local equisized dictionaries. The NMFSE system intercepts such spectral estimates in the semi-supervised speech enhancement process, models each time-frequency bin as a random variable, invokes the spatio-temporal continuity properties of speech signals to build a robust prior, and eventually estimates the most likely value of the spectrum. The NMFSE system gives consistent speech-enhancement performance that is better than a single NMF, while incurring little computational overhead.

Figure 1:
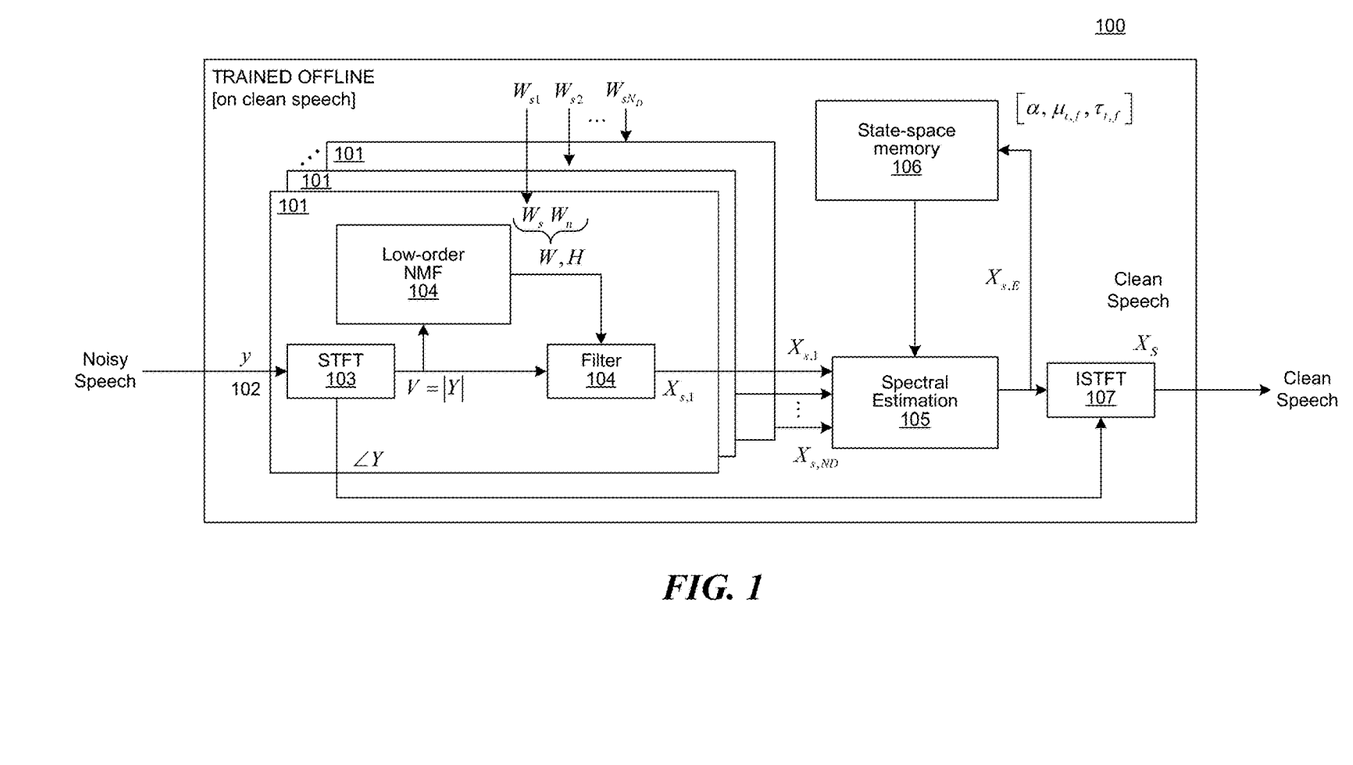
FIG. 1 is a block diagram that illustrates the NMFSE system in some embodiments approach

FIG. 1 is a block diagram that illustrates the NMFSE system in some embodiments approach. The NMFSE system separates speech signals $x_s(t)$ from noisy recordings $y(t)$ in a single channel. The NMFSE system uses clean speech data to train $N_D$ equisized low-order dictionaries 101 (i.e., small number of atoms or basis functions), $W_{si}$, i=1, . . . , $N_D$, offline with distinct random initializations. To enhance a noisy signal y(t) 102 (noisy speech), the NMFSE system uses T time windows to compute 103 the M×T dimensional short-time Fourier transform ("STFT"), Y(t,f) (FD noisy speech representation), of the noisy signal y(t). The NMFSE system assumes independence and linear mixing of speech and noise and fixes the $N_D$ speech dictionaries and uses NMF to factorize the amplitude spectrogram, V, of Y(t,f) represented by Equation 2:

$$V \approx [W_{si}, W_{ni}][H_{si}, H_{ni}] \quad (2)$$

where noise dictionaries, $W_{ni}$, and activations, $H_{si}$ and $H_{ni}$, are determined using the sparse NMF formulation of Equation 1. For each factorization, the NMFSE system reconstructs 104 the speech spectrogram, $X_{si}$ (FD clean speech representation), via a generalized Wiener-filtering approach as represented by Equation 3:

$$X_{si} = \frac{(W_{si}H_{si})^p}{(W_{si}H_{si})^p + (W_{ni}H_{ni})^p} \quad (3)$$

where p (e.g., in the range 1-2) defines the smoothness of the masking function. The NMFSE system then processes the $N_D$ spectrograms, comprising time-frequency components $X_{si}^{tf}$, t=1, . . . , T, f=1, . . . , M, using a spectral estimation technique.

To determine the final amplitude spectrogram (enhanced FD clean speech representation) of the clean speech signal, the NMFSE system considers NMF-estimated values in the time-frequency bins to be independent and identically distributed Gaussian random variables, $X_{si}^{tf} \sim N(\mu, \tau_s^2)$, whose $N_D$ sample values, given by the reconstructed signals $X_{si}^{tf}, \ldots, X_{sN_D}^{tf}$, are used to determine $\mu$ and $\tau_s^2$, expectation $E(X_{si}^{tf})$ and variance $Var(X_{si}^{tf})$, respectively. The NMFSE system obtains the maximum a posteriori probability ("MAP") estimate of $X_{SE}^{tf}$ as represented by Equation 4:

$$X_{SE,MAP}^{tf} = \underset{X_{SE}^{tf}}{\arg\max} P(X_{SE}^{tf} \mid X_{si}^{tf}) = \underset{X_{SE}^{tf}}{\arg\max} P(X_{si}^{tf} \mid X_{SE}^{tf}) P(X_{SE}^{tf}) \quad (4)$$

where $P(X^{tf}|X_{SE}^{tf})$ is the likelihood of the time-frequency component $X^{tf}$ and $P(X_{SE}^{tf})$ is the prior distribution of $X_{SE}^{tf}$.

Figure 2:
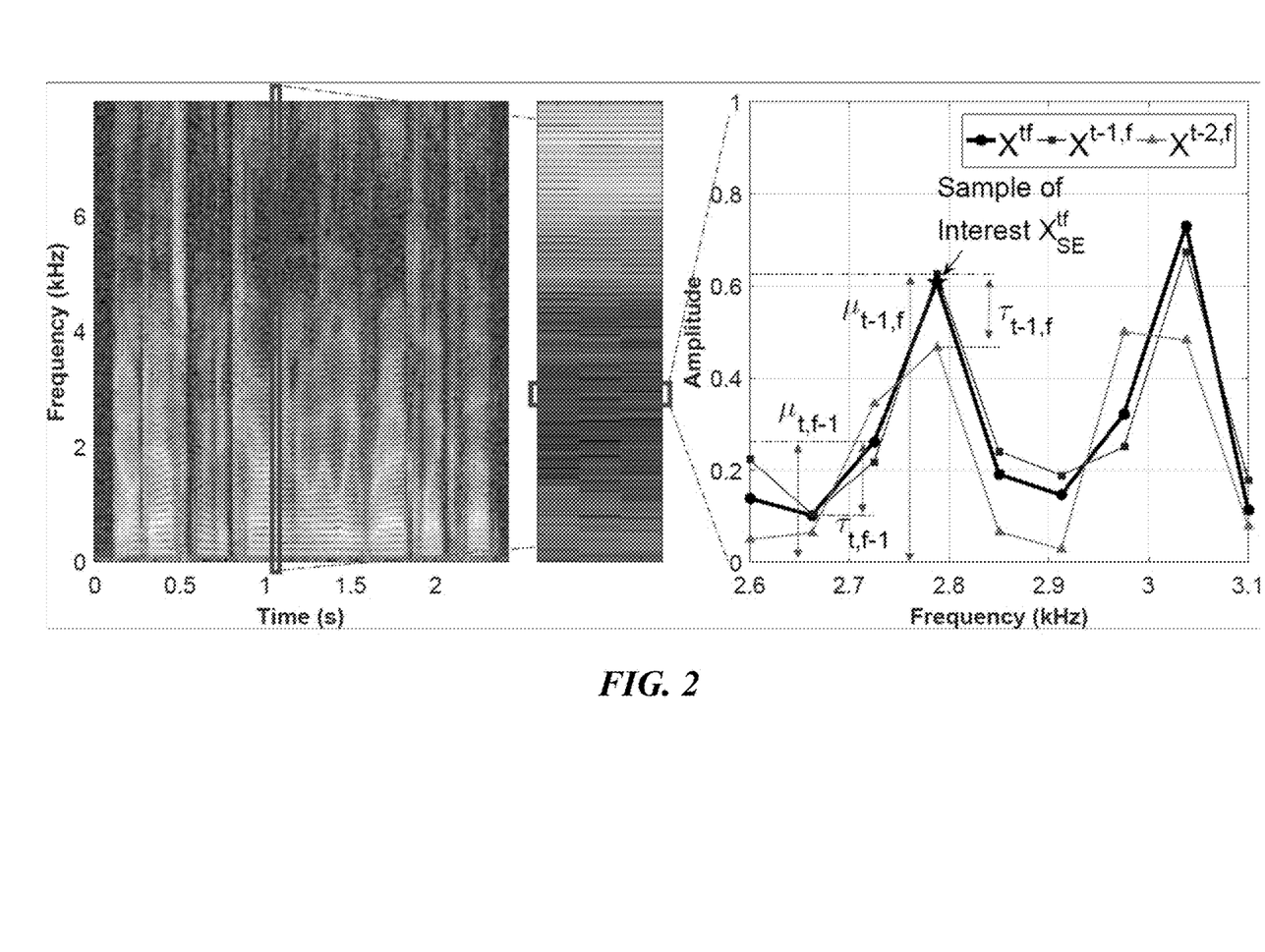
FIG. 2 illustrates the various factors used in the computation of the prior mean and variance.

In some embodiments, the NMFSE system assumes $P(X_{SE}^{tf})=N(\mu_0, \tau_s^2)$, which is a conjugate prior. The NMFSE system determines $\mu_0$ and $\tau_m^2$ based on the spatio-temporal continuity property of speech signals. FIG. 2 illustrates the various factors used in the computation of the prior mean and variance. To determine $\mu_0$ for a sample of interest $X_{SE}^{tf}$, the NMFSE system uses 106 weighted sum of the sample means, $\mu_{t,f-1}$ and $\mu_{t-1,f}$ from the preceding spatio-temporal bins, $X_{si}^{t,f-1}$ and $X_{si}^{t-1,f}$, respectively, as represented by Equation 5:

$$\mu_0 = \alpha \mu_{t,f-1} + (1-\alpha) \mu_{t-1,f} \quad (5)$$

where $\alpha$ (e.g., 0.6) is a parameter that controls the spatio-temporal (ST) scale. Similarly, the NMFSE system determines the prior variance $\tau_m^2$ using a weighted sum of the gradients in the sample mean as represented by Equation 6:

$$\tau_m^2 = \left[ \alpha \left( \frac{\partial \mu_{t,f}}{\partial f} \right)_{f-1} + (1-\alpha) \left( \frac{\partial \mu_{t,f}}{\partial t} \right)_{t-1} \right]^2 \quad (6)$$

$$\approx [\alpha(\mu_{t,f-1}, \mu_{t,f-2}) + (1-\alpha)(\mu_{t-1,f} - \mu_{t-2,f})]^2$$

The NMFSE system solves 105 Equation 4 to obtain the non-negative MAP estimate of each time-frequency bin as represented by Equation 7:

$$X_{SE,MAP}^{tf} = \max\left[0, \frac{N_D \tau_m^2}{N_D \tau_m^2 + \tau_s^2}\left(\frac{1}{N_D}\sum_{j=1}^{N_D} X_{sj}^{tf}\right) + \frac{\tau_s^2}{N_D \tau_m^2 + \tau_s^2}\mu_0\right] \quad (7)$$

where $\tau_s^2$ is the posterior sample variance obtained from $N_D$ NMF estimates of $X_{SE}^{tf}$. The NMFSE system fuses the joint MAP estimate of the spectral components, $X_{SE}$, with phase information $\Phi = \angle STFT[y(t)]$ to obtain the clean speech spectrogram. The NMFSE system then performs 107 an inverse Fourier transform on the clean speech spectrogram to get the final clean speech signal $x_s(t)$. A summary of the end-to-end process is presented in the following algorithm.

---
NMFSE system with spatio-temporal continuity priors
---
Input: Noisy signal y(t), Speech corpus $D_{tr}$, ST scale α
Output: Clean speech signal x(t)
  1: Train dictionaries: $W_{si} \leftarrow NMF(D_{tr}), i = 1,..., N_D$
  2: initialize $V_{M \times T} = |STFT[y(t)]|, \Phi = \angle STFT[y(t)]$
  3: for i := 1 to $N_D$ do     // Over all dictionaries
  4:    $X_{si} \leftarrow NMF[V_{M \times T}, W_{si}, K]$
  5: end for
  6: for [t, f] := 1 to [T, M] do   // Over all ST bins
  7:    $X_{SE}^{tf} \leftarrow X_{SE,MAP}^{tf}$ from Eq.(7)
  8: end for
  9: x(t) = ISTFT[$X_{SE} \cdot e^{j\Phi}$]
---

Figure 3:
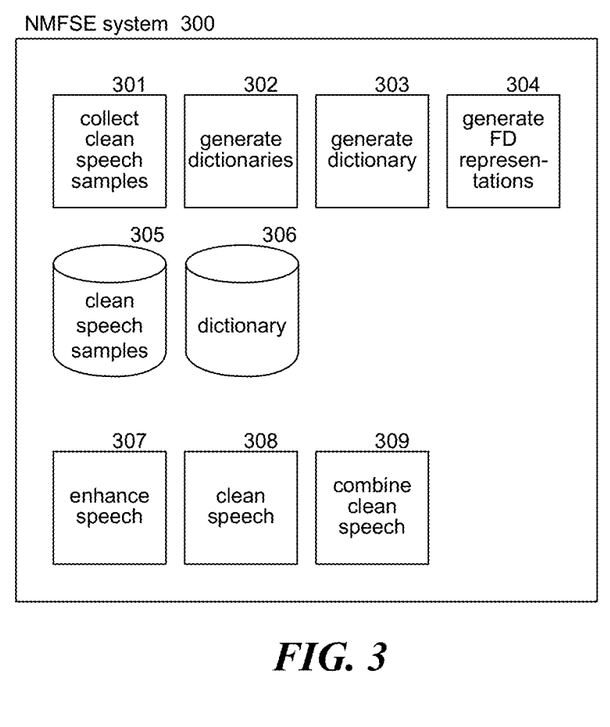
FIG. 3 is a block diagram that illustrates components of the NMFSE system in some embodiments.

FIG. 3 is a block diagram that illustrates components of the NMFSE system in some embodiments. The NMFSE system includes a collect clean speech samples component 301, a generate-dictionaries component 302, a generate-dictionary component 303, and a generate FD representation component 304. Components 301-304 perform the training of the dictionary atoms for the dictionaries. The collect clean speech samples component collects clean speech samples from a variety of people and stores the clean speech samples in a clean speech sample store 305. The generate dictionaries component invokes the generate FD representations component to generate the FD clean speech sample representations of the clean speech samples, invokes the generate dictionary component for each of the dictionaries to generate the dictionary atoms for that dictionary, and stores the dictionary atoms in a dictionary store 306. The NMFSE system also includes an enhance speech component 306, a clean speech component 308, and a combined clean speech component 309 that perform the enhancing of noisy speech using the dictionary atoms of the dictionaries. The enhance speech component invokes the generate FD representations component to generate the FD noisy speech representation of the noisy speech, invokes the clean speech component for each of the dictionaries to generate the corresponding FD clean speech representation for the FD noisy speech representation, and invokes the combined clean speech component to generate the enhanced FD clean speech representation. Although not illustrated, the NMFSE system also includes a component for performing a Fourier transform and an inverse Fourier transform.

The computing systems on which the NMFSE system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, smartphone, tablets, laptops, embedded devices, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the NMFSE system. The data transmission media are used for transmitting data via transitory, propagating signals or carrier waves (e.g., electromagnetism) via a wired or wireless connection.

The NMFSE system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the NMFSE system may be implemented in hardware using, for example, an application-specific integrated circuit (ASIC).

Figure 4:
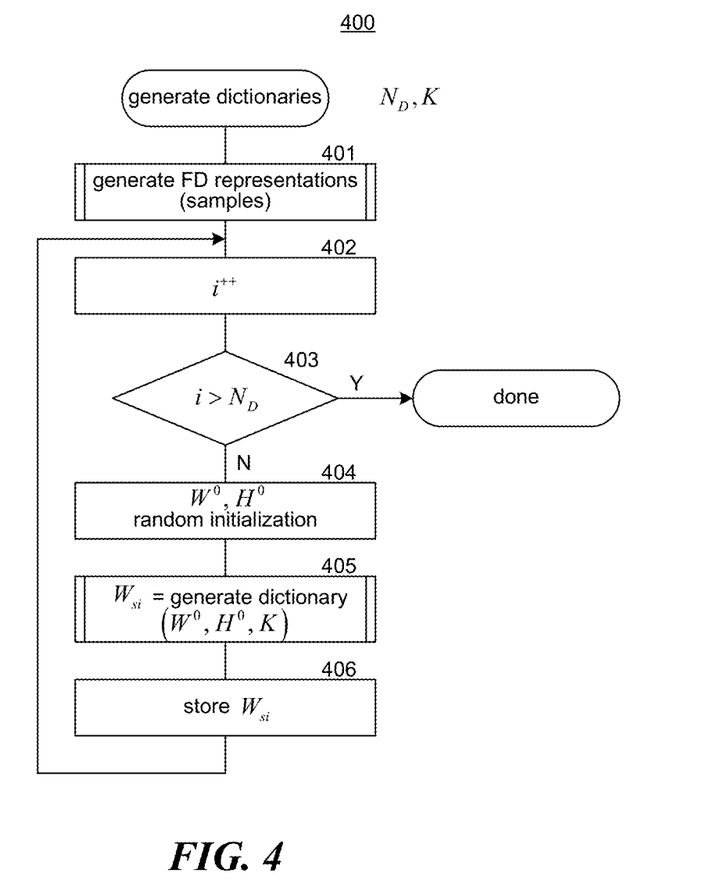
FIG. 4 is a flow diagram that illustrates the processing of a generate dictionaries component in some embodiments.

FIG. 4 is a flow diagram that illustrates the processing of a generate dictionaries component in some embodiments. A generate dictionaries component 400 is invoked to generate a specified number of dictionaries $N_D$ with a specified number of dictionary atoms K using training data—that is clean speech samples. In block 401, the component invokes the generate FD representation component to generate FD clean speech sample representations of the clean speech samples. In blocks 402-406, the component loops generating the dictionary atoms for each dictionary. In block 402, the component increments the count to the next dictionary. In decision block 403, if all the dictionaries have already been generated, then the component completes, else the component continues at block 404. In block 404, the component sets the initial atoms $W^0$ and activations $H^0$ based on an initialization strategy such as random, principal components analysis ("PCA") with different initializations, clustering (e.g., K-means) with different centroids, and so on. In block 405, the component invokes the generate dictionary component to generate the next dictionary using the initial atoms and activations and number of dictionary atoms. In block 406, the component stores the dictionary atoms $W_{si}$ in the dictionary store and then loops to block 402 to increment the count to the next dictionary.

Figure 5:
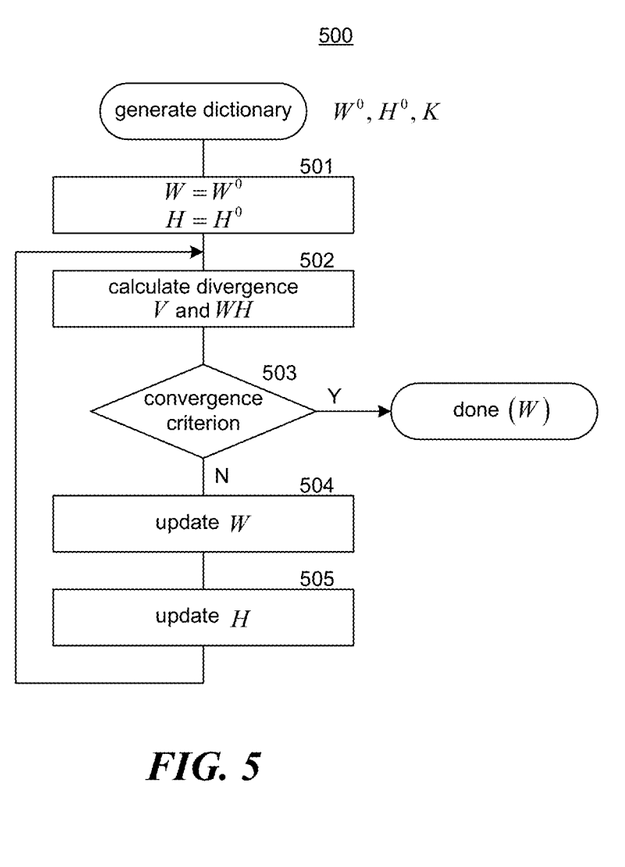
FIG. 5 is a flow diagram that illustrates the processing of a generate dictionary component in some embodiments.

FIG. 5 is a flow diagram that illustrates the processing of a generate dictionary component in some embodiments. A generate dictionary component 500 is invoked to generate the dictionary atoms for a dictionary. The component is passed the initial atoms $W^0$ and activations $H^0$ and the number of dictionary atoms. In block 501, the component initializes the atoms W and activations H based on the random initialization. In block 502, the component calculates a divergence between the current NMF and the FD clean speech sample representations V. In decision block 503, if a convergence criterion is satisfied, then the component completes returning an indication of the dictionary atoms, else the component continues at block 504. In blocks 504-505, the component updates the atoms and the activations and then loops to block 502 to calculate the divergence based on the updated atoms and activations.

Figure 6:
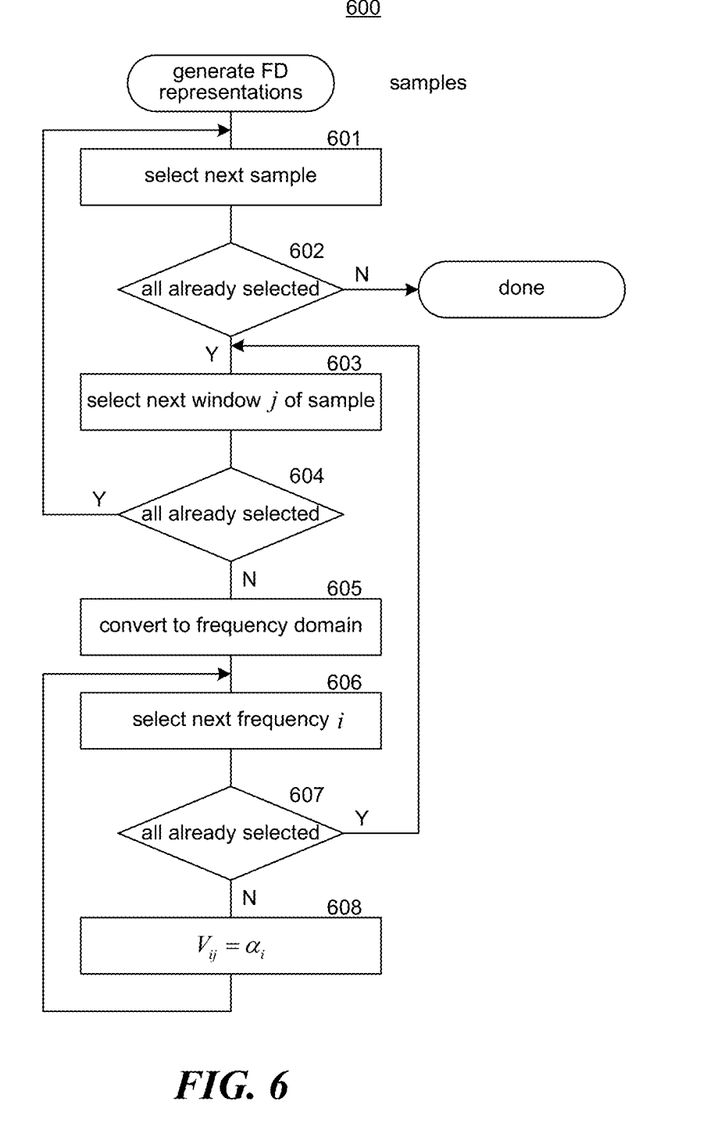
FIG. 6 is a flow diagram that illustrates the processing of a generate FD representations component in some embodiments.

FIG. 6 is a flow diagram that illustrates the processing of a generate FD representations component in some embodiments. A generate FD representations component 600 is invoked to generate a FD representation of one or more samples of speech. In block 601, the component selects the next sample. For example, when generating the dictionaries, each sample may correspond to a short utterance of a person. In decision block 602, if all the samples have already been selected, then the component completes, else the component continues at block 603. In block 603, the component selects the next window of the selected sample. For example, each sample may be divided into frames or windows of 25 ms each. In decision block 604, if all the windows have already been selected, then the component loops to block 601 to select the next sample, else the component continues at block 605. In block 605, the component converts the selected window to the frequency domain using a Fourier transform. In block 606, the component selects the next frequency (or range of frequencies). For example, the frequency domain may be represented by 256 frequencies. In decision block 607, if all the frequencies have already been selected, then the component loops to block 603 to select the next window, else the component continues at block 608. In block 608, the component sets the value for the selected window and frequency to the amplitude at that frequency. The component then loops to block 606 to select the next frequency.

Figure 7:
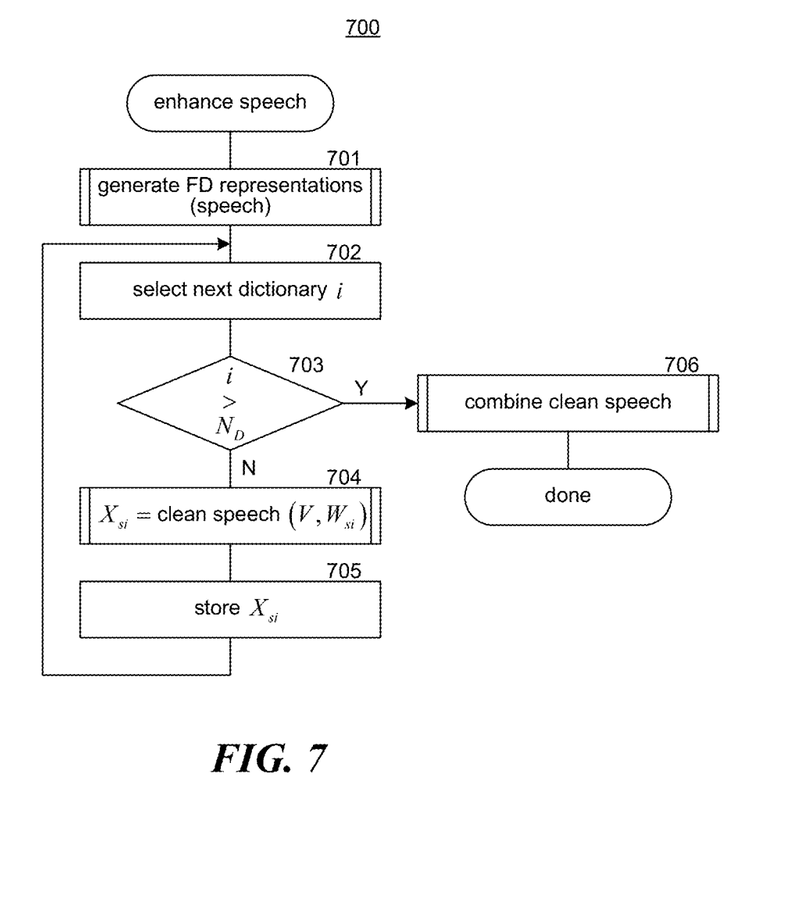
FIG. 7 is a flow diagram that illustrates the processing of an enhanced speech component in some embodiments.

FIG. 7 is a flow diagram that illustrates the processing of an enhance speech component in some embodiments. An enhance speech component 700 is invoked to enhance noisy speech. In block 701, the component invokes the generate FD representations component to generate the FD noisy speech representation of the noisy speech. In block 702, the component selects the next dictionary. In decision block 703, if all the dictionaries have already been selected, then the component continues at block 706, else the component continues at block 704. In block 704, the component invokes the clean speech component passing an indication of the FD noisy speech representation V and the dictionary atoms of the selected dictionary. In block 705, the component stores the FD clean speech representation $X_{si}$ corresponding to the FD noisy speech representation. The component then loops to block 702 to select the next dictionary. In block 706, the component invokes the combine speech component to combine the FD clean speech representations generated using each dictionary into an enhanced FD clean speech representation. Although not illustrated, the component may also perform an inverse Fourier transform to convert on the enhanced FD clean speech representation to generate the enhanced speech. The component then completes. In some embodiments, the processing of the clean speech component that is invoked in block 704 can be performed in parallel, rather than in series. In such a case, the clean speech component may create a separate thread of execution for each dictionary to generate the FD clean speech representation for the dictionary. When all the threads complete their processing, the component then invokes the combine speech component to combine the FD clean speech representations. The parallelization of the NMFs can result in significant improvements in the speed of enhancing speech as a result of the threads executing on multiple processors, on a multi-threaded processor, and so on.

Figure 8:
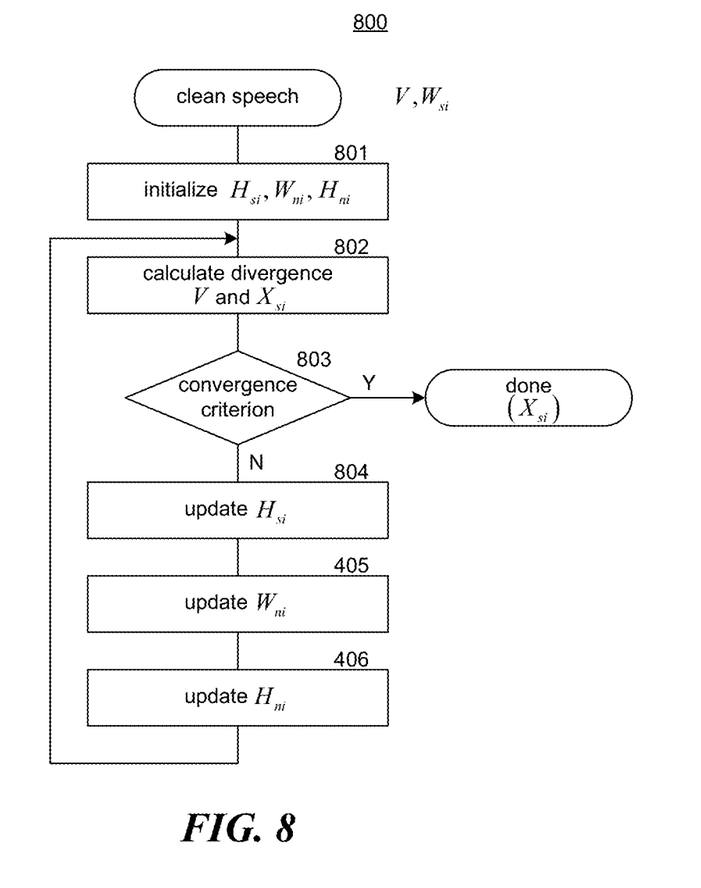
FIG. 8 is a flow diagram that illustrates the processing of a clean speech component in some embodiments.

FIG. 8 is a flow diagram that illustrates the processing of a clean speech component in some embodiments. A clean speech component 800 is invoked to generate FD clean speech representation of a FD noisy speech representation V based on dictionary atoms $W_{si}$ of a dictionary. In block 801, the component performs an initialization using an initial strategy (e.g., random, PCA-based, clustering-based, and so on) of activations $H_{si}$ to represent the speech portion and atoms $W_{ni}$ and activations $H_{ni}$ to represent the noise portion of the noisy speech. In block 802, the component calculates a divergence based on NMF using the dictionary atoms and the current activations for the speech portion and current atoms and activations for noise portion. In decision block 803, if the convergence criterion is satisfied, then the component completes returning an indication of the FD clean speech representations $X_{si}$, else the component continues at block 804. In blocks 804-806, the component updates the current activations for the speech portion and the current atoms and activations for the noise portion and then loops to block 802 to calculate the divergence based on the updated values.

Figure 9:
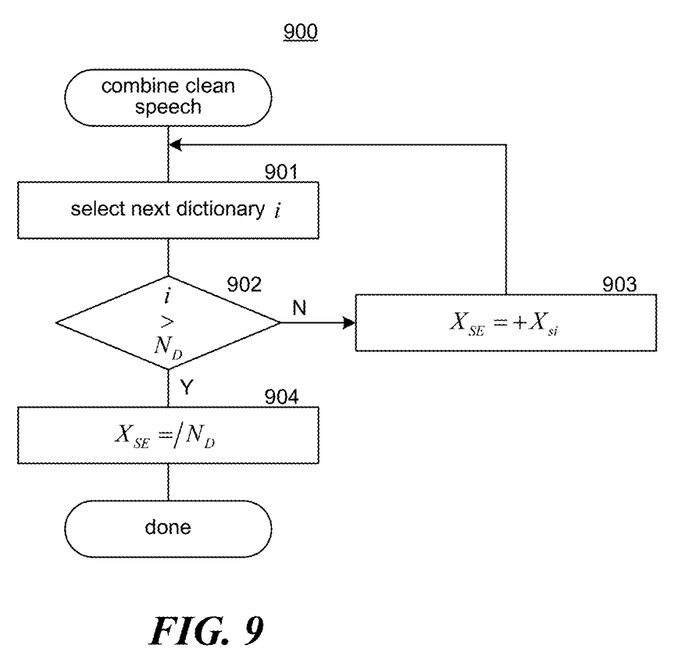
FIG. 9 is a flow diagram that illustrates the processing of a combine clean speech component in some embodiments.

FIG. 9 is a flow diagram that illustrates the processing of a combine clean speech component in some embodiments. A combine clean speech component is invoked to combine the FD clean speech representations generated based on the dictionaries into an enhanced FD clean speech representation. In block 901, the component selects the next dictionary. In decision block 902, if all the dictionaries have already been selected, then the component continues at block 904, else the component continues at block 903. In block 903, the component generates a running total of the FD clean speech representations and then loops to block 901 to select the next dictionary. In block 904, the component divides the running total by the number of dictionaries to generate an average and then completes. Although not illustrated, the combine clean speech component also factors in the spectral estimation according to Equation 7.

The following paragraphs describe various embodiments of aspects of the NMFSE system. An implementation of the NMFSE system may employ any combination of the embodiments. The processing described below may be performed by a computing device with a processor that executes computer-executable instructions stored on a computer-readable storage medium that implements the NMFSE system.

In some embodiments, a method performed by a computing device for enhancing speech is provided. The method accesses multiple dictionaries of dictionary atoms. The dictionaries are generated from clean speech samples by performing a non-negative matrix factorization ("NMF") of frequency-domain ("FD") clean speech sample representations of the clean speech samples. Each NMF has a unique initialization. The method receives noisy speech. The method generates a FD noisy speech representation of the noisy speech. For each of the multiple dictionaries, the method generates a FD clean speech representation corresponding to the FD noisy speech representation by performing a NMF of the FD noisy speech representation based on the dictionary atoms of the dictionaries. The method then generates an enhanced FD clean speech representation of the noisy speech by combining the FD clean speech representations and converts the enhanced FD clean speech representation into clean speech that represents an enhancement of the noisy speech. In some embodiments, the combining further includes averaging the FD clean speech representations. In some embodiments, the combining is based on a maximum a posteriori probability. In some embodiments, the method further generates a mean and variance based on the FD clean speech representations. In some embodiments, the method further determines a phase associated with the FD noisy speech representation and wherein the converting of the enhanced FD clean speech representation factors in the phase. In some embodiments, the method further generates the dictionaries by receiving clean speech samples; generating FD clean speech sample representations of the clean speech samples; and for each of the dictionaries, generating initial dictionary atoms and activations based on an initialization strategy. The method then performs a NMF starting with the initial dictionary atoms and activations and adjusting the dictionary atoms and activations until a convergence criterion to the FD clean speech sample representations is satisfied. In some embodiments, the performing of the NMF of the FD noisy speech representation is based on the dictionary atoms of the dictionary and includes generating initial activations based on an initialization strategy; and performing a NMF starting with the dictionary atoms and the initial activations and adjusting the activations until a convergence criterion to the FD noisy speech representations is satisfied.

In some embodiments, a computing system for enhancing speech is provided. The computing system comprises one or more computer-readable storage media storing computer-executable instructions and one or more processors for executing the computer-executable instructions stored in the one or more computer-readable storage media. When executed, the instructions cause the computing system to access multiple dictionaries of dictionary atoms. The instructions also cause the computing system to receive a frequency-domain ("FD") noisy speech representation of noisy speech. For each of the multiple dictionaries, the instructions also cause the computing system to generate a FD clean speech representation corresponding to the FD noisy speech representation by performing a non-negative matrix factorization ("NMF") of the FD noisy speech representation based on the dictionary atoms of the dictionary; and generate an enhanced FD clean speech representation by combining the FD clean speech representations. In some embodiments, the instructions also cause the computing system to convert the enhanced FD clean speech representation into clean speech that represents an enhancement of the noisy speech. In some embodiments, the instructions also cause the computing system to generate the FD noisy speech representation of the noisy speech. In some embodiments, the instructions also cause the computing system to determine a phase associated with the FD noisy speech representation and wherein the instructions that convert the enhanced FD clean speech representation factors in the phase. In some embodiments, the instructions also cause the computing system to combine by generating an average of the generated FD clean speech representations. In some embodiments, the combining is based on a maximum a posteriori probability. In some embodiments, the instructions also cause the computing system to generate a mean and variance based on the FD clean speech representations. In some embodiments, the instructions also cause the computing system to generate the dictionaries by receiving clean speech samples; generating FD clean speech sample representations of the clean speech samples; and for each of the dictionaries, generating initial dictionary atoms and activations based on an initialization strategy; and performing a NMF starting with the initial dictionary atoms and activations and adjusting the dictionary atoms and activations until a convergence criterion with the generated FD clean speech sample representations is satisfied. In some embodiments, the instructions that perform the NMF of the FD noisy speech representation based on the dictionary atoms of the dictionary includes instructions that generate initial activations for a speech portion and initializations and activations for a noisy portion of the noisy speech based on an initialization strategy; and perform a NMF starting with the dictionary atoms and the initial activations for the speech portion and initial atoms and activations for the noise portion and adjusting the activations for the speech portion and the atoms and activations for the noise portion until a convergence criterion to the FD noisy speech representation is satisfied. In some embodiments, the instructions to generate the FD clean speech representation are executed in parallel by the one or more processors.

In some embodiments, a method performed by a computing device for enhancing speech is provided. The method receives noisy speech. The method generates a FD noisy speech representation of the noisy speech. For each of multiple dictionaries, the method generates a FD clean speech representation corresponding to the FD noisy speech representation by performing a NMF of the FD noisy speech representation based on dictionary atoms of the dictionary. Each dictionary represents a different NMF based on the same clean speech samples. The method generates an enhanced FD clean speech representation of the noisy speech by combining the generated FD clean speech representations. The method converts the enhanced FD clean speech representation into clean speech that represents an enhancement of the noisy speech. In some embodiments, the method further generates the dictionaries by receiving clean speech samples; generating FD clean speech sample representations of the clean speech samples; and for each of the dictionaries, generating initial dictionary atoms and activations; and performing a NMF starting with the initial dictionary atoms and activations and adjusting the dictionary atoms and activations until a convergence criterion is satisfied. In some embodiments, the performing of the NMF of the FD noisy speech representation based on the dictionary atoms of the dictionary includes generating initial activations; and performing a NMF starting with the dictionary atoms and the initial activations and adjusting the activations until a convergence criterion is satisfied. In some embodiments, the FD clean speech representations for the dictionaries are generated in parallel. In some embodiments, the generating of the FD clean speech representation for each of the multiple dictionaries are performed by a separate thread of execution for each dictionary.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the NMFSE system may be employed to clean speech for a variety of applications. The applications may include cleanup of speech (1) transmitted via telephones such as cell phones, land line phones, and satellite phones, or via voice over internet protocol; (2) for voice recognition; (3) for the hearing impaired; (4) of movies and other recorded speech; and so on. Accordingly, the invention is not limited except as by the appended claims.

We claim:

1. A method performed by a computing device for enhancing speech, the method comprising:

accessing multiple dictionaries of dictionary atoms, the dictionaries being generated from clean speech samples by performing a non-negative matrix factorization ("NMF") of frequency-domain ("FD") clean speech sample representations of the clean speech samples, each NMF having a unique initialization, wherein each of the multiple dictionaries comprises a reduced number of dictionary atoms to conserve processing power;

receiving noisy speech;

generating a FD noisy speech representation of the noisy speech;

for each of the multiple dictionaries, generating a FD clean speech representation corresponding to the FD noisy speech representation by performing a NMF of the FD noisy speech representation based on the dictionary atoms of the dictionaries;

generating an enhanced FD clean speech representation of the noisy speech by combining the FD clean speech representations generated using each dictionary with the reduced number of dictionary atoms, the combining includes averaging the FD clean speech representations; and converting the enhanced FD clean speech representation into clean speech that represents an enhancement of the noisy speech.

2. The method of claim 1 wherein averaging the FD clean speech representations includes iteratively performing the following steps until each dictionary has been selected:

selecting a dictionary of the multiple dictionaries of dictionary atoms;

obtaining a non-negative maximum a posteriori probability estimate of a time-frequency component; and generating a running total of the FD clean speech representations; and dividing the running total by a number of the multiple dictionaries to generate the enhanced FD clean speech representation.

3. The method of claim 2 wherein the combining further includes fusing the non-negative maximum a postériori probability of spectral components with phase information.

4. The method of claim 3 further comprising generating a mean and variance based on the FD clean speech representations.

5. The method of claim 1 further comprising determining a phase associated with the FD noisy speech representation and wherein the converting of the enhanced FD clean speech representation factors in the phase.

6. The method of claim 1 further comprising generating the dictionaries by:

receiving clean speech samples;

generating FD clean speech sample representations of the clean speech samples; and for each of the dictionaries, generating initial dictionary atoms and activations based on an initialization strategy; and performing a NMF starting with the initial dictionary atoms and activations and adjusting the dictionary atoms and activations until a convergence criterion to the FD clean speech sample representations is satisfied.

7. The method of claim 1 wherein the performing of the NMF of the FD noisy speech representation based on the dictionary atoms of the dictionary includes:

generating initial activations based on an initialization strategy; and performing a NMF starting with the dictionary atoms and the initial activations and adjusting the activations until a convergence criterion to the FD noisy speech representations is satisfied.

8. A computing system for enhancing speech, the computing system comprising:

one or more computer-readable storage media storing computer-executable instructions that, when executed, cause the computing system to:

access multiple dictionaries of dictionary atoms;

receive a frequency-domain ("FD") noisy speech representation of noisy speech;

for each of the multiple dictionaries, generate a FD clean speech representation corresponding to the FD noisy speech representation by performing a non-negative matrix factorization ("NMF") of the FD noisy speech representation based on the dictionary atoms of the dictionary, wherein each of the multiple dictionaries comprises a reduced number of dictionary atoms to conserve processing power; and generate an enhanced FD clean speech representation by combining the FD clean speech representations generated using each dictionary with the reduced number of dictionary atoms, the combining includes averaging the FD clean speech representations; and one or more processors for executing the computer-executable instructions stored in the one or more computer-readable storage media.

9. The computing system of claim 8 wherein the computer-executable instructions include instructions that convert the enhanced FD clean speech representation into clean speech that represents an enhancement of the noisy speech.

10. The computing system of claim 9 wherein the computer-executable instructions include instructions that generate the FD noisy speech representation of the noisy speech.

11. The computing system of claim 10 wherein the computer-executable instructions include instructions that determine a phase associated with the FD noisy speech representation and wherein the instructions that convert the enhanced FD clean speech representation factors in the phase.

12. The computing system of claim 8 wherein the computer-executable instructions include instructions that averaging the generated FD clean speech representations includes iteratively performing the following steps until each dictionary has been selected:

selecting a dictionary of the multiple dictionaries of dictionary atoms;

obtaining a non-negative maximum a postériori probability estimate of a time-frequency component; and generating a running total of the FD clean speech representations; and dividing the running total by a number of the multiple dictionaries to generate the enhanced FD clean speech representation.

13. The computing system of claim 12 wherein the combining further includes fusing the non-negative maximum a postériori probability of spectral components with phase information.

14. The computing system of claim 13 wherein the computer-executable instructions include instructions that generate a mean and variance based on the FD clean speech representations.

15. The computing system of claim 8 wherein the computer-executable instructions include instructions that generate the dictionaries by:

receiving clean speech samples;

generating FD clean speech sample representations of the clean speech samples; and for each of the dictionaries,
generating initial dictionary atoms and activations based on an initialization strategy; and
performing a NMF starting with the initial dictionary atoms and activations and adjusting the dictionary atoms and activations until a convergence criterion with the generated FD clean speech sample representations is satisfied.

16. The computing system of claim 8 wherein the computer-executable instructions that perform the NMF of the FD noisy speech representation based on the dictionary atoms of the dictionary includes instructions that:
generate initial activations for a speech portion and initializations and activations for a noisy portion of the noisy speech based on an initialization strategy; and
perform a NMF starting with the dictionary atoms and the initial activations for the speech portion and initial atoms and activations for the noise portion and adjusting the activations for the speech portion and the atoms and activations for the noise portion until a convergence criterion to the FD noisy speech representation is satisfied.

17. The computing system of claim 8 wherein the instructions to generate the FD clean speech representation are executed in parallel by the one or more processors.

18. A method performed by a computing device for enhancing speech, the method comprising:
receiving noisy speech;
generating a FD noisy speech representation of the noisy speech;
for each of multiple dictionaries, generating a FD clean speech representation corresponding to the FD noisy speech representation by performing a NMF of the FD noisy speech representation based on dictionary atoms of the dictionary, wherein each dictionary represents a different NMF based on the same clean speech samples, and wherein each of the multiple dictionaries comprises a reduced number of dictionary atoms to conserve processing power;
generating an enhanced FD clean speech representation of the noisy speech by combining the generated FD clean speech representations generated using each dictionary with the reduced number of dictionary atoms, the combining includes averaging the FD clean speech representations by iteratively performing the following steps until each dictionary has been selected:
selecting a dictionary of the multiple dictionaries of dictionary atoms;
obtaining a non-negative maximum a postériori probability estimate of a time-frequency component; and
generating a running total of the FD clean speech representations; and
dividing the running total by a number of the multiple dictionaries to generate the enhanced FD clean speech representation; and
converting the enhanced FD clean speech representation into clean speech that represents an enhancement of the noisy speech.

19. The method of claim 18 further comprising generating the dictionaries by:
receiving clean speech samples;
generating FD clean speech sample representations of the clean speech samples; and
for each of the dictionaries,
generating initial dictionary atoms and activations; and
performing a NMF starting with the initial dictionary atoms and activations and adjusting the dictionary atoms and activations until a convergence criterion is satisfied.

20. The method of claim 18 wherein the performing of the NMF of the FD noisy speech representation based on the dictionary atoms of the dictionary includes:
generating initial activations; and
performing a NMF starting with the dictionary atoms and the initial activations and adjusting the activations until a convergence criterion is satisfied.

21. The method of claim 18 wherein the FD clean speech representations for the dictionaries are generated in parallel.

22. The method of claim 21 wherein the generating of the FD clean speech representation for each of the multiple dictionaries are performed by a separate thread of execution for each dictionary.

* * * * *